United States Patent Office 3,068,080
Patented Dec. 11, 1962

3,068,080
CHARCOAL BRIQUET AND METHOD FOR PRODUCTION OF SAME
Anthony R. Ronzio, Littleton, Colo., assignor to Morco Oil Corporation, Denver, Colo., a corporation of Nevada
No Drawing. Filed July 16, 1959, Ser. No. 827,461
5 Claims. (Cl. 44—17)

This invention relates to a novel and improved charcoal composition which possesses quick starting, smooth burning characteristics and to a method for its production, and more particularly relates to a compressed charcoal briquet which may be quickly and easily ignited for smooth and complete burning with a high heat value notwithstanding conditions under which it is aged.

Charcoal, especially in compressed form, is desirably employed as a fuel for a number of purposes, and particularly as a cooking fuel. However, difficulty has been experienced in the use of charcoal as a fuel on account of its high kindling temperature, and accordingly some exterior heat source such as an inflammable fluid is commonly employed to produce the necessary heat for igniting the charcoal; or oxidants and coating materials are often incorporated into the charcoal to encourage initial starting and ignition thereof. Nevertheless, and in particular with respect to built-in igniting materials, attempts to provide for easily ignitable charcoal have suffered many disadvantages; for instance, inconsistent burning characteristics usually accompanied by incomplete burning of the charcoal, low heat values while burning, and loss of desirable igniting and burning characteristics when stored.

It is accordingly among the objects and purposes of the present invention to provide a reliable, quick starting and smooth burning charcoal composition especially in compressed form which is capable of retaining its ignition, burning and high heat characteristics, notwithstanding aging and the moisture content of the environment to which it is exposed.

It is another object to provide for a novel and improved charcoal briquet, together with a method for preparing the same, which is capable of smooth complete burning with a high heat value and which may be easily ignited without the use of auxiliary fuels, starters, and other devices for igniting notwithstanding variations in humidity and moisture content in the air.

It is a further object to provide for a novel and improved quick starting, smooth burning charcoal briquet which is relatively clean, dustless and non-smudging, inexpensive to manufacture and which provides for improved adhesiveness between the ingredients during burning to prevent fracturing and incomplete burning, but instead forms a loose ash material upon burning.

In accordance with the present invention, the composition, which is preferably compressed into briquet form, is composed of charcoal mixed with a suitable binder and oxidant salt, together with a salt characterized by its ability to absorb moisture, and with the latter possessing the characteristics, and being present in an amount to moderate in a controlled manner the velocity of ignition of the charcoal. This charcoal mixture is preferably prepared into briquet form essentially by mixing the charcoal and starch, adding the oxidant and moderating salt in solution form to the charcoal and starch, mulling the mixture until homogeneous, then compressing and forming the mixture into a number of individual briquets and thereafter drying in a controlled environment in such a way that the resultant products have a predetermined percentage of moisture contained therein. Upon drying, the briquets are then preferably sealed from the atmosphere such as by use of a coating material or container. In the alternative where the briquet is not dried to retain a certain percentage of moisture, the amount and character of moderating salt to be added is determined by the humidity range to which the briquet will be exposed since the salt will exert a moderating effect on the burning of the charcoal due to the capacity of the salt to absorb moisture.

Many types of charcoal materials may be employed and prepared in various manners in accordance with the present invention, although it is preferred to employ a ground charcoal which is quite dense and hard, and has a low percentage ash content and of inert ingredients. In accordance with conventional practice, the charcoal is commonly ground to a size, or a mixture of grains of varying degrees of fineness. Of course, the charcoal or carbonaceous ingredients will comprise the major porportion of the briquet; that is, will make up well over 50% of the composition. The carbonaceous material may be a wood, vegetable or coal base, although the wood base is greatly preferred.

A number of commercially available materials may be employed to bind or adhere the ingredients forming the charcoal briquet of the present invention together. The binding material employed most desirably has the characteristics of being friable, anl serves to bind and tightly adhere the ingredients together during the mixing process and after the briquets have been compressed into final form. Thus, potato starch, mogul starch, crude wheat starch and various glues, organic and inorganic, such as dextrine and alkali silicates are suitable binders and the binder is added in minor proportions, usually on the order of five parts based on one hundred parts by weight of the total composition. In general, the amount and kind of binder employed will influence the adhesive properties, firmness and non-smudging characteristics of the briquet and the incorporation of potato starch and other pretreated starches has been found very satisfactory for these purposes.

The oxidant selected in the formation of the briquet is preferably of a type which is non-toxic, as are the other ingredients, so as not to give off any harmful or contaminating gases upon combustion, will easily mix and combine with the other ingredients in the formation of the charcoal. To this end, various nitrates of the alkali and alkaline earth metals have been found to be satisfactory such as for example potassium nitrate, sodium nitrate, calcium nitrate and magnesium nitrate. Sodium nitrate is preferred in the composition of the present invention since it is readily available and very inexpensive and has very little tendency to absorb moisture upon combination with the other ingredients. The amount of nitrate employed as an oxidant is dictated mainly by considerations of ease of igniting the briquet, burning time of the briquet and of course the latter is determined by the intended use thereof. Generally, for cooking purposes, the burning time for the briquet is most desirably on the order of 60 to 90 minutes. To establish quick starting of the briquet, the oxidant salt should not be much less than 15 parts by weight of the composition; also, it should not be much greater than 35 parts by weight of the composition as otherwise it may tend to burn too rapidly upon igniting. Actually, the oxidant salt serves as the promotor upon ignition which causes the spark of ignition to travel rapidly initially across the outer covering of the briquet from whence it spreads gradually inwardly throughout the briquet sufficiently to raise the temperature of the charcoal and other constituents above their ignition temperature.

A primary feature of the present invention resides in the addition of a preferably crystalline hygroscopic salt to the composition which is of a type and is added in an amount to moderate and selectively control the velocity of ignition and burning of the oxidant and combustible material to thereby give the resultant briquet composition the best smooth burning characteristics, and notwithstanding conditions under which the briquet is permitted to age. To this end the salt employed, and when added with the other ingredients in the formation of the briquet, possesses the ability to absorb moisture from the air into the briquet until equilibrium in moisture content with its environment is reached and upon burning gives up its water of crystallization at the temperature of ignition of the charcoal so as to quench or moderate the rate of ignition of the carbonaceous ingredient. Although salts of this nature may have been incidentally employed previously in the formation and preparation of charcoal compositions, they have not been employed as quenchers or moderators for the ignition process by the oxidant salt, or at least such has not been carried out in the knowledge that it is the capacity of the salt to release moisture which effectively controls the starting and burning characteristics of the oxidant. Therefore the extent to which the moderating salt will act to moderate the velocity of ignition is not necessarily dependent upon the amount of salt added but is dependent to a greater extent upon the moisture content when the salt has come to equilibrium with the air surrounding the briquet. Thus, the salt present in the briquet will of course absorb water until it reaches a point either where it becomes stable and cannot absorb any more water, or before the saturation point, where it absorbs water until it reaches equilibrium with the moisture content in the air. This is of great importance since the humidity or moisture content in the air will vary over an exceedingly wide range in different areas of the country and for example, may conceivably vary over a fairly wide range in a short period of time in each of the areas. Thus, in the South, the humidity can be expected to be quite high even during the summer months, whereas in the West, the humidity can be expected to be relatively low. The effect of changes in humidity are striking since with large amounts of salt in a briquet the amount of water absorbed when subjected to high humidity could be such that it would be impossible to ignite the briquet without first drying it. Again, when the briquet is thoroughly dried by heating in an oven the same amount of salt would contain so little water that its effect upon the velocity of ignition would be quite negligible. Thus, the quantity of retardant or moderating salt to be added to the charcoal composition is best expressed in terms of the humidity conditions under which it is to be stored, unless stored under controlled environmental conditions or in a sealed container. Also, the preferred range of moderating salt to be employed can only be stated based upon the moisture the entire briquet will absorb when exposed to an environment with a given moisture content, and hence the amount of salt employed will vary in a particular ratio to the percentage increase or decrease of the moisture in the entire briquet in a given environment.

From the above, the optimum percentage of moderating salt to employ based on the total parts by weight of the composition can be determined from that water content present in the composition which will most effectively control the burning characteristics. Experimentally, under controlled humidity conditions, it has been found that the preferred range of moisture content in a charcoal composition containing 22 parts by weight of an oxidant salt such as dry sodium nitrate is 3½ to 6% based on the total composition. Of course, the charcoal and binder ingredients themselves will absorb a limited amount of water and will account for about 2 to 3% of the total. The remaining amount to be absorbed into the briquet must be provided by the moderator salt so that for a given humidity range the salt must have the capacity and be present in an amount sufficient to release the remaining 1½ to 4% necessary for optimum burning.

Various types of inert ingredients may serve the function of absorbing moisture, or are hygroscopic and more specifically reach a stable state of hydration, that is, will give up the water of crystallization which is loosely bound thereto, in hydrated form, at the temperature of the ignition. Many salts have this characteristic although it is preferred to use those derived from the less expensive alkali and alkaline earth metals, such as calcium chloride, calcium nitrate, sodium sulfate, sodium carbonate. In this connection, calcium nitrate represents a type of salt of this class which serves both as a moisture absorbent salt and also as an oxidant such that the amount of the primary oxidant salt present may be correspondingly reduced in amount in proportion to the ability of the calcium nitrate salt to act as an oxidant itself.

In order to properly proportion the amount of salt to be added for ignition moderating purposes, as mentioned, the factors to be considered are the amount of oxidant salt employed, the environmental conditions especially humidity under which the product will be aged prior to use, and the capacity of the charcoal and binder ingredients to absorb moisture. For example, the oxidant salt may be present in the amount of 17–22 parts by weight, the humidity conditions may be in the 10–40% range and the charcoal and starch are capable of absorbing around 2% total moisture in this humidity range, leaving 1½–4% moisture to be absorbed by the moderating salt for correct ignition. From the accompanying Table 1 it will be noted that the salts listed are capable to varying degrees of absorbing water, and each salt will absorb water until it reaches equilibrium with the moisture content in the air.

TABLE 1

| Formula | mol. wt. | Percent water |
|---|---|---|
| $CaCl_2$ | 110 | 0 |
| $CaCl_2.H_2O$ | 129 | 13.9 |
| $CaCl_2.2H_2O$ | 147 | 19 |
| $CaCl_2.6H_2O$ | 219 | 49.7 |
| $Na_2SO_4$ | 142 | |
| $Na_2SO_4.7H_2O$ | 268 | 47 |
| $Na_2SO_4.10H_2O$ | 322 | 56 |
| $Na_2CO_3$ | 106 | |
| $Na_2CO_3.H_2O$ | 124 | 14.5 |
| $Na_2CO_3.7H_2O$ | 232 | 54.2 |
| $Na_2CO_3.10H_2O$ | 286 | 63 |

Thus, for example, under the above stated conditions, the parts by weights of a given salt to be added may be determined by the percent water content of the salt at a humidity of 10–40% which will add 1½–4% water based on the total parts by weight. For example, 3 parts by weight of calcium chloride will, when left standing under 10–40% humidity, absorb water from the air to form a hydrated salt containing about 3% moisture based on the total composition. Other salts such as sodium sulfate which form hydrates will similarly operate to add the necessary amount of water. Based on the amount of water added to the composition by 3 parts by weight calcium chloride it is then possible to determine at least the preferred ratio of moderating salt to oxidant salt which will result in the absorption of water within the range set forth. Since the oxidant salt may range between 15–35 parts by weight the moderating salt should correspondingly vary, and may also vary in ratio independently of the oxidant salt so long as the water absorbed into the briquet remains within the optimum range for most effective burning. Stated another way, based on the oxidant salt being present in the amount of 15 to 35 parts by weight, the water content expressed as a percent of the oxidant salt may vary between about 6 to 18 percent of the oxidant salt at 10 to 40% humidity; or, the ratio of 1 part by weight moderating salt to 6 to 10 parts by weight of oxidant salt has been found to represent a ratio at which the moisture absorbed will stay within the optimum working range. Of course this ratio must be modified to conform to variations in humidity conditions of the environment also because the salt will absorb moisture until it reaches equilibrium with the moisture in the air or reaches a stable level of hydration and this variation is necessarily determined empirically based on the variable capacity of each salt to absorb moisture under particular humidity conditions.

Where humidity conditions are extremely high, for example, 60–100%, the moisture absorption capacity of many crystalline salts rapidly approaches the saturation point and to such an extent that the briquets exhibit a tendency to break up or in effect to become deliquescent in nature, notwithstanding severe reductions in the amounts of crystalline salt present. This condition is of course highly unfavorable and therefore a feature of this invention resides in the method devised to control the amount of moisture present by adding it in the manufacture of the briquet under controlled environmental conditions followed by sealing the briquets. In this way the briquets are not subject to humidity conditions and are open to the air only when burned.

In the preparation of the charcoal mixture, it is preferable to first dry mix the starch and charcoal or carbonaceous ingredients until thoroughly blended. The salts forming the oxidant and moderator are then mixed together by dissolving in water, and the controlling factor in the addition of water to the salts is that the water be added in an amount sufficient to completely dissolve the salts at the temperature to be used in the process. Upon dissolution, the salts can then be added to the starch and charcoal mixture followed by mixing, such as by a mulling procedure, for a limited time interval and until homogeneous. The resultant mix is then compression molded, and this may be carried out in a range of 300–3000 lbs. per square inch although it is greatly preferred to apply a pressure on the order of 2,000 to 3,000 lbs. per square inch which step can be carried out either immediately after the mixture is prepared or following an aging process. By compressing the composition to very high pressures at the level set forth it has been found that an increase in heat output is obtained with a somewhat longer burning time. Once pressed, the mixture may then be divided into a number of individual briquets, following which the briquets are cycled through a drying process under controlled temperatures and humidity. The drying cycle may easily be controlled by passing air, for example, at a predetermined temperature and humidity over the briquets until sufficient moisture is absorbed by the briquets to come within the optimum range of water content to moderate the burning of the charcoal. The briquets may then be packaged, for example, in polyethylene bags so as to effectively seal them from the air.

In the following there are set forth a number of typical examples of the formulation and method of preparation of charcoal briquets, which are given for the purpose of illustration:

*Example 1*

Formula: Pts. by wt., g.
Sodium nitrate _____ 21.5
Calcium chloride, anhydrous _____ 3.0
Potato starch _____ 5.0
Carbon, Wilkins No. 80 _____ 68.75

The calcium chloride is of course employed as the moderating salt, to control the ease of ignition and burning rate of the oxidant salt, sodium nitrate.

The composition was prepared as described and the briquets were dried, then allowed to stand with the humidity controlled in the range of 10–40% until the calcium chloride reached equilibrium with the moisture content in the air. Measurement of the total moisture content was found to be 5.1% of the total weight. Upon lighting, the briquets ignited smoothly with a good heat output and left a very loose ash after complete burning.

*Example 2*

| | G. |
|---|---|
| Sodium nitrate | 21.5 |
| Sodium sulfate, anhydrous | 3.0 |
| Starch, potato | 5.0 |
| Carbon, Wilkins No. 80 | 68.75 |

Again the mixture was prepared but left to stand at a humidity of 30 to 40% and the following tests were run to determine the effects of aging thereon:

| Salt | Days Aged | Ash | Burning time, minutes | Remarks |
|---|---|---|---|---|
| $Na_2SO_4$ | 1 | Very loose | 75 | Ash very hard; Smooth ignition. |
| $Na_2SO_4$ | 4 | ___do___ | 60 | Ignition slow; Some fracture; Slow burning. |
| $Na_2SO_4$ | 18 | ___do___ | 60 | Smooth ignition, burns well, very little carbon left. |

It is suspected that the briquet did not reach equilibrium with the air for a number of days and optimum burning was therefore not obtained until the water content came within the optimum range.

*Example 3*

Formula: Parts by wt., lbs.
Sodium nitrate _____ 15.4
Calcium nitrate _____ 5.6
Starch _____ 5.0
Carbon _____ 68.0

The normal amount of sodium nitrate used, based on the proportions of the other ingredients, would be on the order of 21.2 lbs.; however, calcium nitrate has been found to serve both as an oxidizer and as a quencher to the extent that 1.0 lbs. of pure calcium nitrate is equal to roughly .96 lb. of pure sodium nitrate. Accordingly, the calcium nitrate is proportionately increased and the sodium nitrate proportionately decreased. Upon aging, time-temperature tests were conducted on briquets prepared from this formula in which it was determined that briquets of this type are rapidly and easily ignited, will reach a high heat value in a very short length of time and will maintain a very high heat value over an extended time interval from 60 to 90 minutes. Also, a major advantage with the use of calcium nitrate is that it is very cheap and can be used to partially replace the more expensive oxidant salts.

It will be evident that in the selection and use of ingredients for preparation of the charcoal briquets, it is essential that they be non-toxic, combustible such that harmful or contaminating gases are not given off during combustion, and that all will be combustible into a preferably very loose ash material. The briquet formed in accordance with the present invention also lends itself well to the incorporation of other ingredients such as hickory chips, garlic or impregnated wood if desired to provide flavoring of the smoke formed upon combustion of the briquets. Moreover, if desired to obviate the undesirable effect of excessive humidity, the briquets can be sealed such as by coating the individual briquets with a quick igniting material or by the use of air-tight containers as mentioned.

Summarizing, there has been formulated a greatly improved charcoal composition together with a method of preparing the same where, by utilizing the capacity of certain materials to absorb and release moisture to a predetermined degree, a quick-starting smooth burning fuel is attainable, notwithstanding the normally detrimental effects of aging thereon.

It is to be understood that various changes and modifications in the practice of the present invention may be made without departing from the scope thereof, and it is to be further understood that the foregoing examples and description are to be interpreted as being merely illustrative of certain preferred embodiments of the present invention.

What is claimed is:

1. A quick igniting fuel in the form of a compressed briquet consisting essentially of, by weight, about 15–35 percent of an oxidizing agent from the class consisting of nitrates of alkali and alkaline earth metals; from about 3 to about 6 percent of a hygroscopic material from the class consisting of calcium chloride, calcium nitrate, sodium sulphate and sodium carbonate; about 5 percent of a starch binder; and the remainder charcoal.

2. The fuel briquet of claim 1 having the following approximate percentage composition by weight:

| Component— | Percent |
|---|---|
| Sodium nitrate | 21.88 |
| Calcium chloride | 3.05 |
| Starch | 5.09 |
| Carbon | 69.98 |

3. The fuel briquet of claim 1 having the following approximate percentage composition by weight:

| Component— | Percent |
|---|---|
| Sodium nitrate | 21.88 |
| Sodium sulphate | 3.05 |
| Starch | 5.09 |
| Carbon | 69.98 |

4. The fuel briquet of claim 1 having the following approximate percentage composition by weight:

| Component— | Percent |
|---|---|
| Sodium nitrate | 16.38 |
| Calcium nitrate | 5.95 |
| Starch | 5.32 |
| Carbon | 72.34 |

5. The process for making a quick igniting fuel briquet which comprises making a water solution of a mixture of an oxidizing agent from the class consisting of nitrates of alkali and alkaline earth metals and a hygroscopic material from the class consisting of calcium chloride, calcium nitrate, sodium sulphate and sodium carbonate, removing water from the solution to leave a homogeneous mixture of oxidizing agent and hygroscopic material, thoroughly mixing the last-formed mixture with a thoroughly blended dry mixture of charcoal and starch binder to form a final mixture, compressing said final mixture under a pressure from 300–3000 p.s.i., forming individual briquets from the compressed mixture, and drying the formed briquets.

References Cited in the file of this patent

UNITED STATES PATENTS

| 2,160,442 | De Saint-Gilles et al. | May 30, 1939 |
| 2,799,563 | Shenker | July 16, 1957 |
| 2,876,084 | Leggin | Mar. 3, 1959 |